US012782504B2

(12) United States Patent
Mannesson et al.

(10) Patent No.: US 12,782,504 B2
(45) Date of Patent: Nov. 3, 2026

(54) RESOLVING DOPPLER AMBIGUITY IN TDM-MIMO RADARS BASED ON PHASE AT PEAK

(71) Applicant: Axis AB, Lund (SE)

(72) Inventors: Anders Mannesson, Lund (SE); Mattias Simonsson, Lund (SE); Stefan Adalbjörnsson, Lund (SE); Anders Lloyd, Lund (SE); Bertil Roslund, Lund (SE)

(73) Assignee: Axis AB, Lund (SE)

( * ) Notice: Subject to any disclaimer, the term of this patent is extended or adjusted under 35 U.S.C. 154(b) by 501 days.

(21) Appl. No.: 18/446,012

(22) Filed: Aug. 8, 2023

(65) Prior Publication Data

US 2024/0103129 A1 Mar. 28, 2024

(30) Foreign Application Priority Data

Sep. 21, 2022 (EP) .................................... 22196745

(51) Int. Cl.
*G01S 7/35* (2006.01)
*G01S 13/36* (2006.01)

(52) U.S. Cl.
CPC .............. *G01S 7/356* (2021.05); *G01S 13/36* (2013.01)

(58) Field of Classification Search
CPC ........ G01S 7/356; G01S 13/36; G01S 13/584; G01S 7/0235; G01S 7/354; G01S 7/03;
(Continued)

(56) References Cited

U.S. PATENT DOCUMENTS 8,390,507 B2 3/2013 Wintermantel
8,436,763 B2 5/2013 Wintermantel
(Continued)

FOREIGN PATENT DOCUMENTS

WO 2021/031077 A1 2/2021

OTHER PUBLICATIONS

Bechter, Jonathan, Fabian Roos, and Christian Waldschmidt. "Compensation of Motion-Induced Phase Errors in TDM MIMO Radars." IEEE microwave and wireless components letters 27.12 (2017): 1164-1166. Web. (Year: 2017).*
(Continued)

*Primary Examiner* — Resha Desai
*Assistant Examiner* — Remash R Guyah
(74) *Attorney, Agent, or Firm* — Volpe Koenig

(57) ABSTRACT

A TDM MIMO FMCW radar comprises an array of physical receivers with a first spacing in a first direction and a plurality of physical transmitters arranged with a second spacing in said first direction. A virtual array signal of a range-Doppler bin relating to a scene with a moving object is processed by a phase compensation method, which introduces a phase ambiguity between the subarrays. For each of the subarrays, a frequency spectrum is computed of those elements of the compensated virtual array signal which correspond to consecutive virtual antenna elements generated by physical receivers belonging to the same row. Next, an amplitude-peak frequency is identified jointly for the frequency spectra of the subarrays. Next, a residual phase shift between a pair of the subarrays is determined by comparing, at the amplitude-peak frequency, the respective phases of the frequency spectra.

18 Claims, 6 Drawing Sheets

(58) Field of Classification Search

CPC ............... G01S 2013/0263; G01S 7/35; G01S 7/40–42; G01S 7/411; G01S 7/414; G01S 7/416; G01S 13/00–02; G01S 13/06; G01S 13/34; G01S 13/42; G01S 13/44; G01S 13/87; G01S 13/89–90; G01S 15/89; H04L 5/00; H04L 27/26; H01Q 3/22; H01Q 3/24; H01Q 3/26; H01Q 21/00; H01Q 21/06; H01Q 21/08; H01Q 25/00; G06F 17/14; G06F 17/16; H04B 7/0413; H04B 7/0417; H04B 7/04813

USPC .................................................. 342/196, 109

See application file for complete search history.

(56) References Cited

U.S. PATENT DOCUMENTS

| | | | | |
|---|---|---|---|---|
| 8,665,137 | B2 | 3/2014 | Wintermantel | |
| 9,097,791 | B2 | 8/2015 | Kishigami et al. | |
| 10,627,483 | B2 | 4/2020 | Rao et al. | |
| 10,921,436 | B2 | 2/2021 | Jansen | |
| 11,360,204 | B2 | 6/2022 | Hakobyan et al. | |
| 11,378,649 | B2 | 7/2022 | Rao et al. | |
| 11,428,796 | B2 | 8/2022 | Nam et al. | |
| 11,614,531 | B2 | 3/2023 | Wu et al. | |
| 11,815,585 | B2 | 11/2023 | Wu et al. | |
| 11,867,792 | B2 | 1/2024 | Kim et al. | |
| 11,988,769 | B2 | 5/2024 | Rao et al. | |
| 12,019,142 | B2 | 6/2024 | Nam et al. | |
| 12,019,145 | B2 | 6/2024 | Kishigami | |
| 2011/0074620 | A1 | 3/2011 | Wintermantel | |
| 2011/0074621 | A1 | 3/2011 | Wintermantel | |
| 2011/0080314 | A1 | 4/2011 | Wintermantel | |
| 2011/0280293 | A1 | 11/2011 | Chevalier et al. | |
| 2013/0113653 | A1 | 5/2013 | Kishigami et al. | |
| 2018/0011170 | A1* | 1/2018 | Rao | G01S 7/354 |
| 2019/0187268 | A1* | 6/2019 | Lien | G01S 13/426 |
| 2020/0049812 | A1 | 2/2020 | Jansen | |
| 2020/0081110 | A1 | 3/2020 | Nam et al. | |
| 2020/0182991 | A1 | 6/2020 | Hakobyan et al. | |
| 2020/0209352 | A1 | 7/2020 | Rao et al. | |
| 2020/0233076 | A1* | 7/2020 | Chen | G01S 13/343 |
| 2021/0072350 | A1* | 3/2021 | Loesch | G01S 7/40 |
| 2021/0293949 | A1* | 9/2021 | Breddermann | G01S 13/931 |
| 2021/0333386 | A1* | 10/2021 | Park | G01S 7/356 |
| 2021/0389453 | A1 | 12/2021 | Panzer et al. | |
| 2022/0107402 | A1 | 4/2022 | Kishigami | |
| 2022/0171049 | A1 | 6/2022 | Wu et al. | |
| 2022/0187440 | A1 | 6/2022 | Kishigami | |
| 2022/0283286 | A1 | 9/2022 | Wu et al. | |
| 2022/0334240 | A1 | 10/2022 | Wu et al. | |
| 2022/0342036 | A1 | 10/2022 | Rao et al. | |
| 2022/0365196 | A1 | 11/2022 | Nam et al. | |

OTHER PUBLICATIONS

Shen, Q., & Wang, Q. (2022). Phase Difference based Doppler Disambiguation Method for TDM-MIMOFMCW Radars. arXiv. Org. https://doi.org/10.48550/arxiv.2208.03231 (Year: 2022).*

Liu, C., Gonzalez, H. A., Vogginger, B., & Mayr, C. G. (2021). Phase-based Doppler Disambiguation in TDM and BPM MIMO FMCW Radars. Proceedings (IEEE Radio and Wireless Symposium. Online), 87-90. https://doi.org/10.1109/RWS50353.2021.9360348 (Year: 2021).*

M. Dikshtein, O. Longman, S. Villeval and I. Bilik, "Automotive Radar Maximum Unambiguous Velocity Extension Via High-Order Phase Components," in IEEE Transactions on Aerospace and Electronic Systems, vol. 58, No. 1, pp. 743-751, Feb. 2022, doi: 10.1109/TAES.2021.3103262. (Year: 2022).*

X. Hu, Y. Li, M. Lu, Y. Wang and X. Yang, "A Multi-Carrier-Frequency Random-Transmission Chirp Sequence for TDM MIMO Automotive Radar," in IEEE Transactions on Vehicular Technology, vol. 68, No. 4, pp. 3672-3685, Apr. 2019, doi: 10.1109/TVT.2019.2900357 (Year: 2019).*

Baral Ashwin Bhobani et al., "Joint Doppler Frequency and Direction of Arrival Estimation for TDM MIMO Automotive Radars", IEEE Journal of Selected Topics in Signal Processing, IEEE, US, vol. 15, No. 4, Apr. 15, 2021, pp. 980-995.

Li Xinrong et al., "Signal Processing for TDM MIMO FMCW Millimeter-Wave Radar Sensors", IEEE Access, vol. 9, Jan. 1, 2021, pp. 167959-167971.

Hafner Stephan et al., "Compensation if Motion-Induced Phase Errors and Enhancement of Doppler Unambiguity in TDM-MIMO Systems by Model-Based Estimation", IEEE Sensors Letters, IEEE, vol. 4, No. 10, Sep. 1, 2010, p. 1-4.

Schmid Christian M. et al., "Motion compensation and efficient arrary design for TDMA FMCW MIMO radar systems", 2012 6th European Conference On Antennas and Propagation (EUCAP), Jun. 1, 2012, pp. 1746-1750.

Roos et al., "Enhancement of Doppler Unambiguity for Chirp-Sequence Modulated TDM-MIMO Radars," 2018 IEEE MTT-S International Conference on Microwaves for Intelligent Mobility (ICMIM), 2018, pp. 1-4.

Bechter et al., "Compensation of Motion-Induced Phase Errors in TDM MIMO Radars," in IEEE Microwave and Wireless Components Letters, vol. 27, No. 12, pp. 1164-1166, Dec. 2017.

Rao, "MIMO Radar", Application Report SWRA554A, Texas Instruments Incorporated, Dallas TX, Jul. 2018.

United States Office Action issued on Sep. 18, 2024 for U.S. Appl. No. 18/358,215.

* cited by examiner

RESOLVING DOPPLER AMBIGUITY IN TDM-MIMO RADARS BASED ON PHASE AT PEAK

FIELD OF INVENTION

The present disclosure is related to signal processing in time-division multiplexing (TDM) multiple-input multiple-output (MIMO) frequency-modulated continuous-wave (FMCW) radar equipment. In particular, it proposes an improved method for resolving a velocity-induced phase ambiguity in a virtual radar array.

TECHNICAL BACKGROUND

A radar array may consist of a single physical transmitter and a plurality of physical receivers. The effective number of elements in the physical radar array is equal to the number of physical receivers. The number of elements determines the resolution of a radar array. For example, the angular resolution in angle-of-arrival (AoA) computations improves as the number of elements in the radar array grows. The AoA of a moving object can be computed by the following steps:

1. Record an intermediate-frequency (IF) signal for a plurality of chirps (frequency ramps) and multiple radar array elements.
2. Perform two discrete harmonic transformations (e.g., fast Fourier transform, FFT) to obtain, for each radar array element, a signal made up of range-Doppler bins.
3. Select one range-Doppler bin corresponding to a moving object in the scene.
4. Compute the AoA based on the phase shifts among the radar array elements, e.g., as an angle-FFT or AoA-FFT.

To increase the effective number of radar array elements, MIMO radar has been proposed. A MIMO radar array has multiple physical receivers as well as M≥2 physical transmitters, and this gives rise to a virtual radar array with $M_rM$ elements, where $M_r$ is the number of physical receivers. FIG. 1A shows an example setup with two physical transmitters 10 and four physical receivers 20. FIG. 1B shows the resulting virtual array, in which two subarrays 40 of the eight virtual antenna elements 30 can be discerned and traced back to the respective physical transmitters that generated them. Within each subarray 40, further, the spatial configuration of the virtual antenna elements 30 (e.g., geometry, orientation) is identical to the spatial configuration of the physical receivers 20, as emphasized by the consistently used labels A, B, C and D.

The physical transmitters in a MIMO radar may be fed in synchroneity using a multi-carrier signal, such as an orthogonal frequency-division multiplexing signal. As an alternative, to limit expenditure on antenna structures and to be able to feed all physical transmitters from a common signal synthesizer, the concept of a TDM MIMO radar has been proposed, in which the physical transmitters are used in time alternation. FIG. 5 illustrates the operation of a TDM MIMO radar of the frequency-modulated continuous-wave (FMCW) type with M=2 physical transmitters. Here, frequency is plotted against time, wherein the solid and dashed lines refer to chirps transmitted from a first and second physical transmitter, respectively. The symbol $T_c$ denotes the chirp length, $T_r$ the chirp repetition time, and $T_{fr}=MT_r$ the chirp repetition period for the same transmit antenna. The frequency axis does not necessarily start at the origin. In a representative millimeter-wave radar, each chirp sweeps from 77 GHz to 81 GHz and for a duration of $T_c$=40 μs.

In a TDM MIMO radar, because the observed object has time to move a small radial distance between consecutive transmissions from different physical transmitters, the subarrays of virtual antenna elements will be separated by relative velocity-induced phase shifts. With knowledge of the radial velocity of the moving object, it is possible to compensate the velocity-induced phase shifts (Doppler correction). Such a compensation may render data from a TDM MIMO radar suitable for AoA computations, as follows:

1. Record an IF signal for a plurality of chirps and multiple radar array elements.
2. Perform two discrete harmonic transformations to obtain, for each radar array element, a signal made up of range-Doppler bins.
3. Select one range-Doppler bin corresponding to a moving object in the scene.
4. Compensate the relative velocity-induced phase shifts among the radar array elements (Doppler correction).
5. Compute the AoA based on the phase shifts after said compensation. Without step 4 (Doppler correction), the phase offsets measured by the virtual receivers would have contributions from both the relative velocity and the AoA. The present disclosure will be concerned primarily with improvements to step 4. These improvements will be of utility not only in the determination of AoA but, in principle, in any computation that starts from a phase-compensated array signal.

Many of the limitations of available Doppler correction techniques are related to frequency folding. It can be shown theoretically that radar data allows a moving object's radial velocity to be unambiguously determined only if the object's radial speed |v| is less than $$v_{max} = \frac{c}{2f_c} f_{D,max}, \tag{1}$$

where $f_{D,max}$ denotes the maximum Doppler frequency and $f_c$ is a representative carrier-wave frequency, such as the center frequency of the radar chirp. If the moving object has a higher inward or outward radial speed, then, due to the frequency folding (or aliasing), the radar will observe the moving object with an apparent Doppler frequency that is shifted by an integer multiple of $2f_{D,max}$. This is illustrated in the upper half of FIG. 6, in which upward arrows represent amplitude peaks in a range-Doppler spectrum for four objects that move at different velocities $v_\zeta$ correspond to four different Doppler frequencies $f_{D\zeta}=f_D+2_{D,max}$, where ζ=−1,0,1,2. Although these velocities are distinct, the frequency folding in the radar will shift all four Doppler-frequency peaks into the fundamental period $|f|\le f_{D,max}$ where they will appear at $f_D$. Conversely, because any amplitude peak observed using this radar will appear in the fundamental period $|f|\le f_{D,max}$, the true Doppler frequency is ambiguous at the outset. The resolving of this phase ambiguity—conceptually an undoing of the frequency folding—is essential to the determination of the true Doppler frequency and, thus, to the determination of the velocity of the moving object.

The frequency folding also limits the usefulness of TDM MIMO radars, namely, since the relative velocity-induced phase shifts among the radar array elements can be compensated unambiguously only up to the maximum Doppler frequency $f_{D,max}$. In a TDM MIMO radar with M physical transmitters operated with a chirp repetition time of $T_r$, the maximum Doppler frequency is given by $$f_{D,max} = \frac{1}{2MT_r}, \tag{2}$$

whereby $$v_{max} = \frac{c}{2f_c}\frac{1}{2MT_r}. \tag{3}$$

How this affects objects that move at a velocity $|v|>v_{max}$ and are imaged by a TDM MIMO radar with M=4 subarrays will be explained with reference to the lower half of FIG. 6. The sequence TX1, TX2, TX3, TX4 refers to a transmission schedule by which the physical transmitters are operated, and m=1,2,3,4 is a subarray index. The plotted quantity is the phase after compensation based on the apparent Doppler frequency has been applied.

As FIG. 6 shows, in the reference case $\zeta=0$, the apparent Doppler frequency in the fundamental period $|f|\le f_{D,max}$ coincides with the true Doppler frequency. When $\zeta=0$, indeed, no frequency folding takes place, and the velocity can be unambiguously detected. It is seen in the lower half of FIG. 6 that the phase of the object grows steadily from one virtual array element to the next, also at the three boundaries between subarrays. The compensated phase grows steadily because the AoA is nonzero in the plane of the virtual antenna array, which leads to path differences; these AoA-induced phase shifts are independent of the radial velocity of the observed object. For faster moving objects ($\zeta\ne0$), this steady phase growth is accompanied by an additional phase offset $$\varphi_{1,2}(\xi) = e^{i2\pi\frac{\xi}{M}} \tag{4}$$

at each boundary (solid vertical line) between consecutive subarrays. Generalizing equation (4), the phase offset from the first to the $m^{th}$ subarray is given by $$\varphi_{1,m}(\xi) = e^{i2\pi\frac{\xi(m-1)}{M}}, \tag{5}$$

and the phase offset between subarrays having indices m' and m is equal to $$\varphi_{m',m}(\xi) = e^{i2\pi\frac{\xi(m-m')}{M}}. \tag{6}$$

The phase offset is what remains after the relative velocity-induced phase shift has been compensated based on the apparent Doppler frequency. The phase offset can be described in terms of the discrete Fourier transform (DFT), denoted S(f), of the virtual array signal for one range-Doppler bin. More precisely, the phase offset is the phase rotation that relates this DFT for the $m^{th}$ subarray evaluated at the true Doppler frequency and the same DFT evaluated at the apparent Doppler frequency:

$$S_{TXm}(f_D) = S_{TXm}\left(f_D + \frac{\xi m}{M} f_{D,max}\right)e^{i2\pi\frac{\xi m}{M}}, \tag{7}$$

where $|f_D|\le f_{D,max}$. A compensation of the relative velocity-induced phase shifts, as in step 4 of the second AoA algorithm, will effectively be a subtraction of the velocity-induced phase shifts that separate different subarrays. After the phase compensation, the (folding-induced) phase offsets between subarrays still remain in the virtual array signal, which makes it unusable for AoA computations. Apart from exceptional situations where the true Doppler frequency is known, the phase offsets (6) cannot be computed a priori. Instead, the phase ambiguity has to be resolved by approximate methods or by utilizing supplementary data regarding the moving object.

The fact that the phase offsets remain in the signal after the relative velocity-induced phase shifts have been compensated could be understood, alternatively, to be a result of the uncertainty in the moving object's speed.

To resolve the phase ambiguity, one option is to include spatially overlapping virtual antenna elements in the virtual array. This can be achieved by coordinating the spacing of the physical transmitters with the geometry of the physical receivers. In the example of FIG. 1A, if the separation L2 of the physical transmitters 10(TX1), 10(TX2) is decreased to a mere 3d units, then the virtual antenna element D in the first subarray 40(TX1) will coincide with the virtual antenna element A in the second subarray 40(TX2) in FIG. 1B. By forcing the overlapping virtual antenna elements to have equal phases, the correct phase offset between the two subarrays 40(TX1), 40(TX2) can be inferred. This approach could be rather onerous from a hardware perspective, however, as the second virtual antenna element in an overlapping pair will not be supplying any data in addition to the first one, hence will not contribute to a better resolution.

The research paper F. Roos, J. Bechter, N. Appenrodt, J. Dickmann and C. Waldschmidt, "Enhancement of Doppler Unambiguity for Chirp-Sequence Modulated TDM-MIMO Radars," 2018 IEEE MTT-S *International Conference on Microwaves for Intelligent Mobility* (*ICMIM*), 2018, pp. 1-4, doi: 10.1109/ICMIM.2018.8443352, reports on measurements and simulations where data from a virtual array with M=2 subarrays was successfully fitted to the phase offset equation (5) in the case $|\zeta|=1$. Roos et al. expect to use this direct approach for estimating $\zeta$ on the basis of data from virtual arrays with a greater number of subarrays, provided reliable phase data is available.

The patent application US20210293949A1 describes a method where initially a number of tentative AoA values are estimated using data from the full virtual array after different, mutually alternative phase compensations have been applied in accordance with respective speed-folding hypotheses. In many automotive applications, like those considered in US20210293949A1, the total number of speed-folding hypotheses (i.e., values of the $\zeta$ parameter to be tried) is manageable since a considerable number of hypotheses can be ruled out beforehand in view of regulatory speed limits and the like. Additionally, a reference AoA value is estimated using only data from a single subarray in the virtual array. Being based on a smaller data set, the reference AoA value will be less accurate but is certain not to suffer from frequency-folding artefacts. From the tentative AoA values, that value will be selected which best matches the reference AoA value, and this is the output of the method.

The patent U.S. Ser. No. 10/627,483B2 is based on a realization that errors introduced in the phase of the phase-compensated virtual array signal give rise to unique signatures in the angle-FFT spectrum. For example, the angle-FFT spectrum could include two peaks caused by one object which are separated by a characteristic angle, such as $3\pi/8$ radians. These signatures are detected and used to correct for a condition where $|v|$ has exceeded the maximum unambiguously detectable speed $v_{max}$. Further, U.S. Ser. No.

10/627,483B2 describes a phase compensation method (or Doppler correction method) for removing relative velocity-induced phase shifts among the radar array elements.

SUMMARY

One objective of the present disclosure is to make available a computationally efficient method for resolving a phase ambiguity between subarrays in a virtual array of a TDM MIMO FMCW radar. A further objective is to propose such a method with a configurable degree of accuracy, so that implementers can choose to balance the accuracy against the computational effort as desired. A further objective is to propose such a method that is applicable to a radar with two or more physical transmitters. A further objective is to propose a method for estimating a one- or two-dimensional angle of arrival based on data from a virtual radar array. A still further objective is to make available a signal processing device and computer program that perform phase ambiguity resolution.

At least some of these objectives are achieved by the present disclosure as defined by the independent claims. The dependent claims relate to advantageous embodiments of the disclosure.

In a first aspect, there is provided a method of resolving a phase ambiguity between subarrays in a virtual array of a TDM MIMO FMCW radar, which comprises an array of physical receivers and a plurality of physical transmitters. The array of physical receivers includes at least one row of physical receivers with a first spacing $L_1$ in a first direction, and the physical transmitters are arranged with a second spacing $L_2$ in the same first direction. In general, the present method can be executed without knowing numerical values of the first and second spacings $L_1$, $L_2$. Each of the subarrays in the virtual array is generated (or synthesized) by a combination of the array of physical receivers and one of the physical transmitters. The method begins with the obtaining of a virtual array signal of a range-Doppler bin relating to a scene with a moving object. A range-Doppler bin may be described as one element in a range-Doppler spectrum corresponding to a combination of a range interval and a velocity interval. The virtual array signal includes one value of the range-Doppler bin for each virtual antenna element of the virtual array. Next, a velocity-induced phase shift of the virtual array signal is compensated using any suitable phase compensation method, and a compensated virtual array signal is obtained as output. The phase compensation method introduces a phase ambiguity between the subarrays if the moving object's velocity exceeds a threshold. This threshold is a physical constant, not a user-configured value; it may be equal or proportional to the maximum unambiguously detectable speed $v_{max}$ evaluated for a single subarray. The method further comprises, computing, for each of a plurality of the subarrays, a frequency spectrum of those elements of the compensated virtual array signal which correspond to consecutive virtual antenna elements generated by physical receivers belonging to the same row. An amplitude-peak frequency (i.e., a frequency for which the amplitude is locally or globally maximal) is identified jointly for the frequency spectra of said plurality of the subarrays. Further, a residual phase shift between a pair of the subarrays within said plurality of subarrays is determined, e.g., by comparing, at the amplitude-peak frequency, the respective phases of the frequency spectra. An inverse of the residual phase shift can then be applied to the compensated virtual array signal.

The proposed approach to resolving the phase ambiguity between subarrays is efficient since specialized hardware devices and software routines exist for computing a frequency spectrum, especially from discrete data. This allows data from a large number of virtual antenna elements to be taken into account, such as a full row of subarrays, which favors the accuracy of the method. The output data of a successful execution of the method is a virtual array signal without the velocity-induced phase shift and without the residual phase shift (or phase offset), which is folding-induced. The output data is thereby suitable for use in computations, as if the virtual array signal had been collected by a physical array with an equal number of antenna elements.

In some embodiments, identifying the amplitude-peak frequency includes determining a frequency of a main amplitude peak in a sum of the two frequency spectra's respective amplitude parts. The sum refers to a sum of functions, i.e., the amplitude parts are summed frequency bin by frequency bin. These embodiments are generally easy to implement and they execute robustly.

In other embodiments, identifying the amplitude-peak frequency includes determining a frequency which corresponds to a main or non-main amplitude peak in each of the respective frequency spectra's amplitude parts. A main amplitude peak may be described as a global amplitude maximum of the frequency spectrum; a non-main amplitude peak can be a local amplitude maximum which is not the global amplitude maximum. These embodiments may be slightly more delicate to implement—including the decision-making whether to recognize a local amplitude maximum as a main or non-main peak, and the coordination among different frequency spectra—but are less prone to capture artefacts. An artefact in this sense may be an amplitude fluctuation which is not a reflection off the moving object of interest.

In some embodiments, determining the residual phase shift includes computing a difference between the respective phases of the frequency spectra at the amplitude-peak frequency.

In some embodiments, where the virtual antenna elements of the virtual array are equidistant in the first direction (also across subarray boundaries), said determining of the residual phase shift further includes rounding the difference between the respective phases of the frequency spectra to a multiple of $2\pi/M$, where M is the number of physical transmitters. The equidistancy of the virtual antenna elements can be ensured if, for example, if $L_2/L_1$ is equal to the number of physical receivers, $M_r$. Equidistant spacing tends to simplify later computations in which the output data of the method is used, especially for AoA estimation. To be precise, M is the number of physical transmitters with a separation in the first direction, and $M_r$ is the number of physical transmitters with a separation in the first direction.

In some embodiments, where the respective phases of the frequency spectra are compared, at the amplitude-peak frequency, for a plurality of pairs of subarrays which are uniformly spaced in the first direction, the residual phase shift is determined as a mean over all said pairs of the subarrays. These embodiments, where data from more than one pair of subarrays is used, represent an optional accuracy improvement; it is up to each implementer whether the better accuracy justifies the additional computational effort. An optional further accuracy improvement may be attained, additionally or alternatively, when the subarray has a plurality of rows in the first direction, namely by performing the steps of computing a frequency spectrum and identifying an amplitude-peak frequency for each of these rows, after which the residual phase shift is determined as a mean over all rows.

Some embodiments target cases where the array of physical receivers includes at least one column of physical receivers with a third spacing $L_3$ in a second direction and where the physical transmitters are arranged with a fourth spacing $L_4$ in said second direction. It is noted that the terms row and column do not refer to absolute orientations but is a pure naming convention. In these embodiments, the method further comprises: computing, for each of a second plurality of the subarrays, a frequency spectrum of those elements of the compensated virtual array signal which correspond to consecutive virtual antenna elements generated by physical receivers belonging to the same column; identifying a second amplitude-peak frequency jointly for the frequency spectra of said second plurality of the subarrays; determining a second residual phase shift between a second pair of the subarrays within said plurality of subarrays by comparing, at the amplitude-peak frequency, the respective phases of the frequency spectra; and applying an inverse of the second residual phase shift to the compensated virtual array signal. In these embodiments, the residual phase shift induced by a Doppler effect in a second spatial coordinate is determined and cancelled. The output data of the total method will be suitable for two-dimensional AoA computations, e.g., returning an azimuth and an elevation component of the AoA.

It is foreseen, in some embodiments, to determine the residual phase shift for all remaining subarrays of the virtual array and apply inverses thereof. Accordingly, the resulting virtual array signal will be free from the velocity-induced phase shift and the (folding-induced) residual phase shift.

In some embodiments, there is provided a method of computing an angle of arrival of a moving object on the basis of a virtual array signal of a range-Doppler bin captured by a virtual array of a TDM MIMO FMCW radar. The method comprises: processing the virtual array signal using the above-described method; and computing the angle or arrival on the basis of the processed virtual array signal.

In a second aspect of the disclosure, there is provided a signal processing device for a TDM MIMO FMCW radar with a virtual array, wherein the TDM MIMO FMCW radar comprises an array of physical receivers including at least one row of physical receivers with a first spacing in a first direction, and further comprises a plurality of physical transmitters arranged with a second spacing in said first direction, wherein the virtual array comprises subarrays, each subarray generated by a combination of the array of physical receivers and one of the physical transmitters. The signal processing device comprises processing circuitry configured to resolve, in a virtual array signal comprising at least one range-Doppler bin, a phase ambiguity between the subarrays of the virtual array by performing the above method.

The signal processing device according to the second aspect generally shares the advantages of the first aspect, and it can be implemented with an equal degree of technical variation.

The disclosure further relates to a computer program containing instructions for causing a computer, or the signal processing device in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1A:
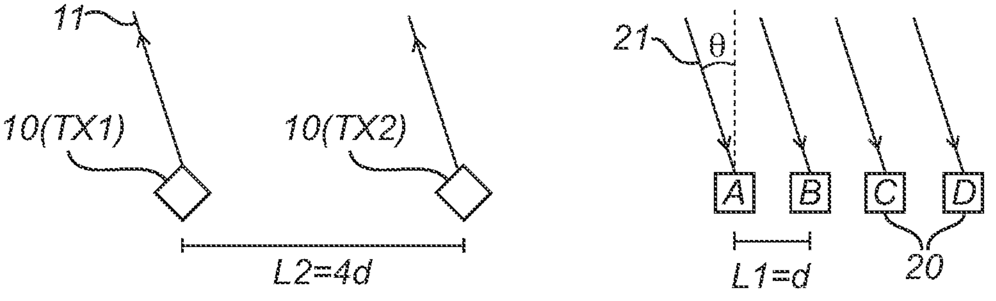
FIGS. 1A-1B shows one-dimensional arrays of physical transmitters and physical receivers and a resulting one-dimensional virtual array.

FIG. 1A shows a one-dimensional array of physical transmitters 10, configured to transmit a radio-frequency (RF) beam 11 towards a scene and a one-dimensional array of physical receivers 20 configured to receive a RF 21 beam reflected by an object (not shown) in the scene. It is appreciated that a complete radar equipment may include, in addition to the physical transmitters 10 and physical receivers 20, the functional stages mixing, analog-to-digital conversion, radio-frequency frontend processing (on the basis of the IF signal) and digital beamforming, as enumerated from the antenna end onwards. The physical transmitters 10 are used according to a configured transmission schedule, here corresponding to the repeating sequence TX1, TX2. (The present disclosure considers transmission schedules that are permutations of the physical transmitters; this excludes, say, the transmission schedule TX1, TX1, TX2, TX2.)

Relative to the main direction of transmission and receipt (main lobe), corresponding to the vertical direction on the drawing, the reflecting object is viewed under an angle θ. The angle θ corresponds to the AoA of the object. For the avoidance of doubt, the physical transmitters 10 are typically configured to transmit in all directions over a nonzero angular range, which include the direction in the angle θ but are not limited to it. As indicated in FIG. 1A, further, the physical transmitters 10 are spaced by $L_2$=4d units, for some constant d, and the physical receivers 20 are equidistant with a spacing of $L_1$=d units.

With reference to the appended patent claims, it is noted that the physical transmitters 10 and the physical receivers 20 in FIG. 1A fulfil the requirement of having a nonzero spacing in a common first direction, the horizontal direction in FIG. 1A. While the row of physical transmitters 10 and row of physical receivers 20 in FIG. 1A are even arranged oriented parallel to each other, this is not essential for the applicability of the method 700. In fact, the requirement is fulfilled as soon as the physical transmitters 10 and the physical receivers 20 each have a spacing with a nonzero component in a common first direction, as would be still the case, say, if the row of physical receivers 20 was slanted upwards relative to the row of physical transmitters 10.

Figure 1B:
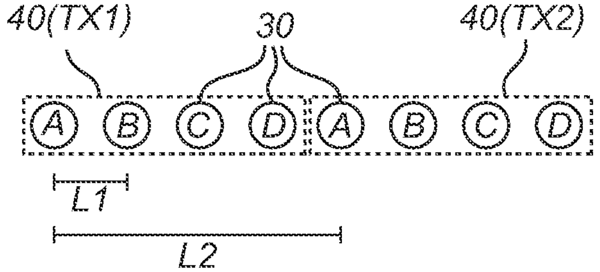

FIG. 1B shows a one-dimensional virtual array of virtual array elements 30, which is generated when the array of physical transmitters 10 is operated in conjunction with the array of physical receivers 20. The virtual array is generated in the sense that, during one chirp repetition period $T_f$, measurement data is read from each physical receiver 20 once for each active physical transmitter 10. (It is recalled that data from a plurality of chirp repetition periods is normally required for any velocity computation, e.g., for the providing of a Doppler FFT. In other words, data is collected from multiple chirps for each virtual array element.) The measurement data thus collected, a virtual array signal, may be organized as a matrix X with dimensions equal to the dimensions of the virtual array. In the 1×8 case illustrated in FIG. 1B, the appearance of this matrix can be:

$$X = [x_{TX1,A}\ x_{TX1,B}\ x_{TX1,C}\ x_{TX1,D}\ x_{TX2,A}\ x_{TX2,B}\ x_{TX2,C}\ x_{TX2,D}], \quad (8)$$

where $x_{TX1A}$ denotes measurement data read from the physical receiver 20 labeled A while it is excited by the first physical transmitter 10(TX1), $x_{TX2,A}$ denotes measurement data read from the same physical receiver 20 while excited by the second physical transmitter 10(TX2), and so forth. It may be considered that the virtual array in FIG. 1B is divided into two subarrays 40, which are each in a one-to-one relationship with the physical transmitter 10 that provides the excitation. Each measurement data entry in X may be, for example, a digital representation of an intermediate-frequency (IF) signal obtained by mixing the signal fed to the physical transmitter 10 with the signal received from the physical receiver 20. The digital representation may for instance be a row matrix of time samples. Further, each entry in X may be a data structure collecting measurement data from a plurality of radar chirps; for example, the measurement data entry may be represented as a matrix where the chirps correspond to rows.

Apart from the frequency folding, to be addressed below, the virtual array signal X is normally indistinguishable from a physical array signal collected by a 1×8 array of physical receivers excited by a single physical transmitter.

Within each subarray 40, the geometry and orientation of the array of physical receivers 20 is preserved, including their spacing $L_1$. This is visualized by using the same labels A, B, C, D for the physical receivers 20 and for the virtual antenna elements 30 of each subarray 40. Two virtual antenna elements 30 in different subarrays 40 which have been generated by the same physical receiver 20 will be referred to as homologous in the present disclosure. In the figures, two homologous virtual antenna elements 30 share the same label, e.g., A. The spacing of the subarrays 40 is equal to the spacing of the physical transmitters 10, that is, $L_2$ units in the first direction.

The effects of using a two-dimensional array of physical transmitters 10 or a two-dimensional array of physical receivers 20, or both, will be briefly discussed with reference to the examples in FIGS. 2A-2B, 3A-3B and 4A-4B. As will become apparent from these examples, the virtual array generated by an array of physical transmitters 10 and an array of physical receivers 20 corresponds to a convolution of these two arrays. For a general introduction to the structure and operation of MIMO radars, reference is made to S. Rao, "MIMO Radar", Application Report SWRA554A, Texas Instruments Incorporated, Dallas TX, July 2018.

Figure 2A:
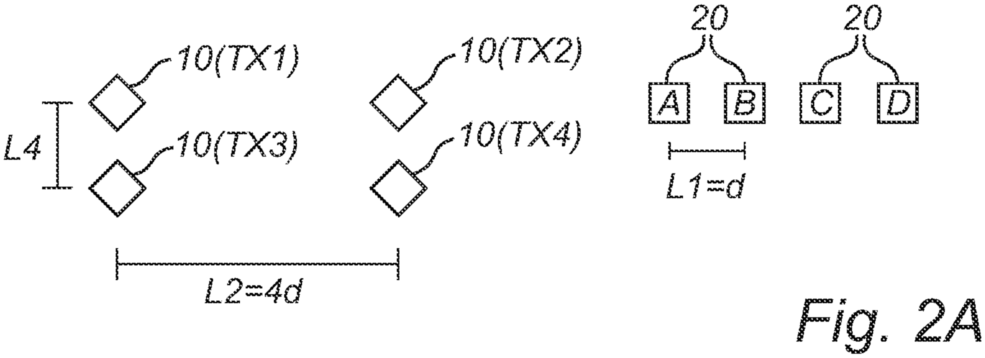
FIGS. 2A-2B shows a two-dimensional array of physical transmitters, a one-dimensional array of physical receivers and a resulting two-dimensional virtual array.

In FIG. 2A, the array of physical transmitters 10 has two rows and two columns. The column spacing is $L_2$=4d units (first direction, horizontal on the drawing) and the row spacing is $L_4$ units (second direction, vertical on the drawing). The array of physical receivers 20 has dimension 1×4, with a spacing of $L_1$=d units. While the physical transmitters 10 in FIG. 2A are arranged in two orthogonal directions, this orthogonality is by no means an essential for the applicability of the present disclosure. Rather, a spacing with a nonzero component in the first or second direction, as applicable, is sufficient.

Figure 2B:
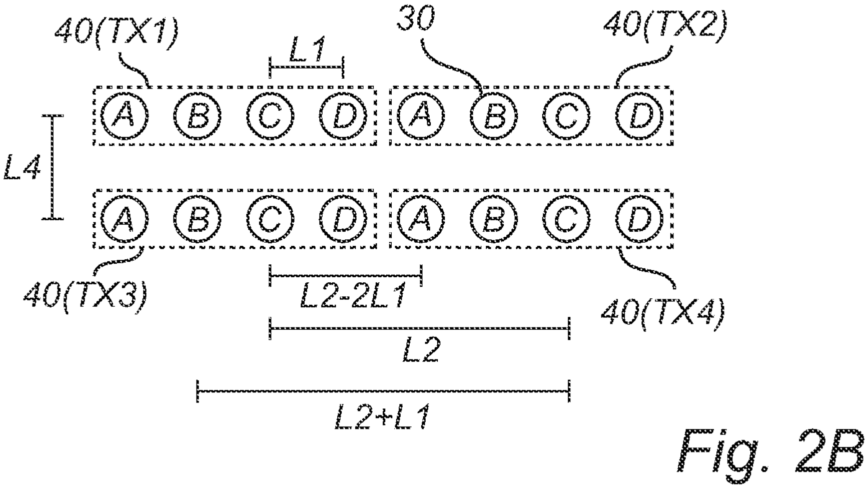

The resulting virtual array, with four subarrays 40, is shown in FIG. 2B, where example inter-element spacings are indicated. The spacing in the first direction of consecutive virtual antenna elements inside a subarray 40 is equal to the spacing of the physical receivers 20, $L_1$ units. The spacing in the first direction between homologous virtual antenna elements 30 belonging to a pair of subarrays is either $L_2$ units (in the pairs TX1-TX2 and TX3-TX4) or zero (in the pairs TX1-TX3 and TX2-TX4). The spacing with respect to the second direction is not more than $L_2$ units for any pair of homologous virtual antenna elements 30. The spacing in the second direction between homologous virtual antenna elements 30 belonging to a pair of subarrays is either zero (in the pairs TX1-TX2 and TX3-TX4) or $L_4$ units (in the pairs TX1-TX3 and TX2-TX4). The spacing between any pair of non-homologous virtual antenna elements, in the first or second direction, can be computed as linear combinations of these basic distances. For example, the distance between the second virtual antenna element B in the third subarray 40(TX3) and the third virtual antenna element C in the fourth subarray 40(TX4) is $L_1$+$L_2$ units. Similarly, the distance between the third virtual antenna element C in the third subarray 40(TX3) and the first virtual antenna element A in the fourth subarray 40(TX4) is $L_2$-2$L_1$ units.

A virtual array signal collected using the virtual array in FIG. 2B may be represented as a 2×8 matrix with the following general appearance:

$$X = \begin{bmatrix} x_{TX1,A} & x_{TX1,B} & x_{TX1,C} & x_{TX1,D} & x_{TX2,A} & x_{TX2,B} & x_{TX2,C} & x_{TX2,D} \\ x_{TX3,A} & x_{TX3,B} & x_{TX3,C} & x_{TX3,D} & x_{TX4,A} & x_{TX4,B} & x_{TX4,C} & x_{TX4,D} \end{bmatrix}. \quad (9)$$

Alternatively, the matrix elements may be arranged in a single row. This way, data from different chirps can correspond to different rows of the matrix.

Figure 3A:
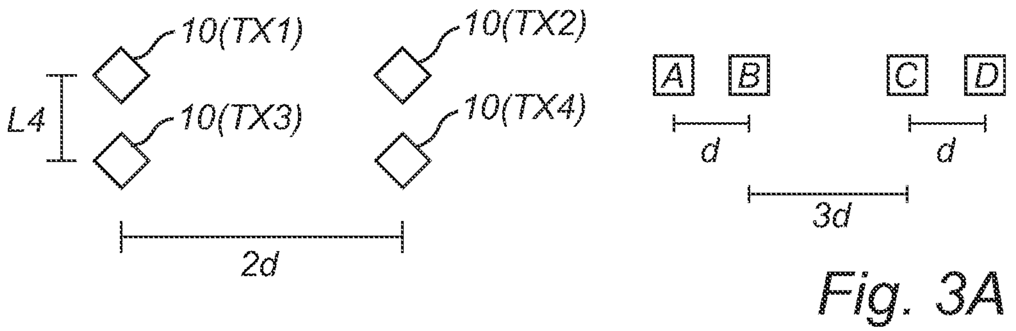
FIGS. 3A-3B shows a two-dimensional array of physical transmitters, a one-dimensional array of physical receivers and a resulting two-dimensional virtual array.
Figure 3B:
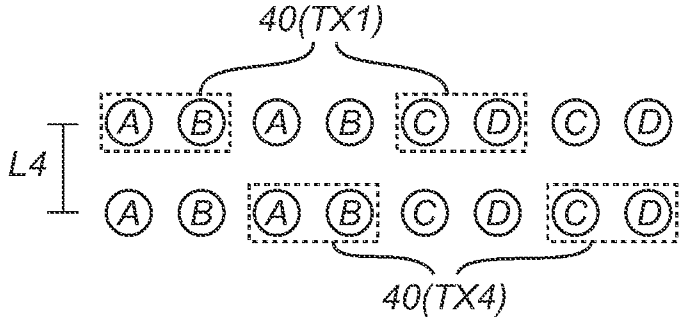

In FIG. 3A, the physical transmitters 10 are arranged with a different column spacing than in FIG. 2A, 2*d* units in the first direction, and the row of physical receivers 20 are spaced sequentially by d, 3d and d units. The resulting virtual array, as shown in FIG. 3B, will have the same dimension 2×8 as the virtual array in FIG. 2B, though with a different subarray structure. The first subarray 40(TX1) comprises the first, second, fifth and sixth virtual antenna elements 30 on the first row of the virtual array; and the second subarray comprises the third, fourth, seventh and eighth virtual antenna elements on the first row. The virtual antenna elements 30 on each row are equidistant, with a spacing of d.

Figure 4A:
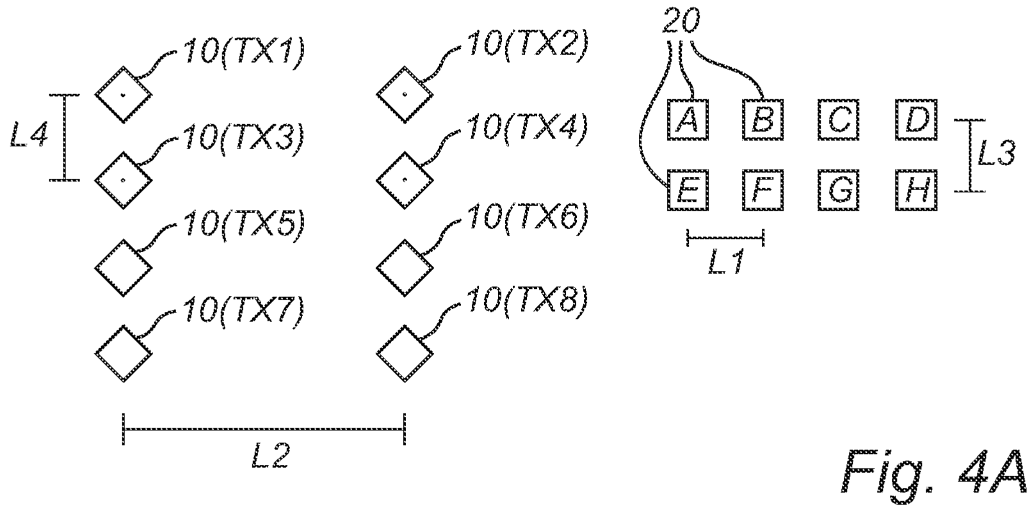
FIGS. 4A-4B shows two-dimensional arrays of physical transmitters and physical receivers and a resulting two-dimensional virtual array.
Figure 4B:
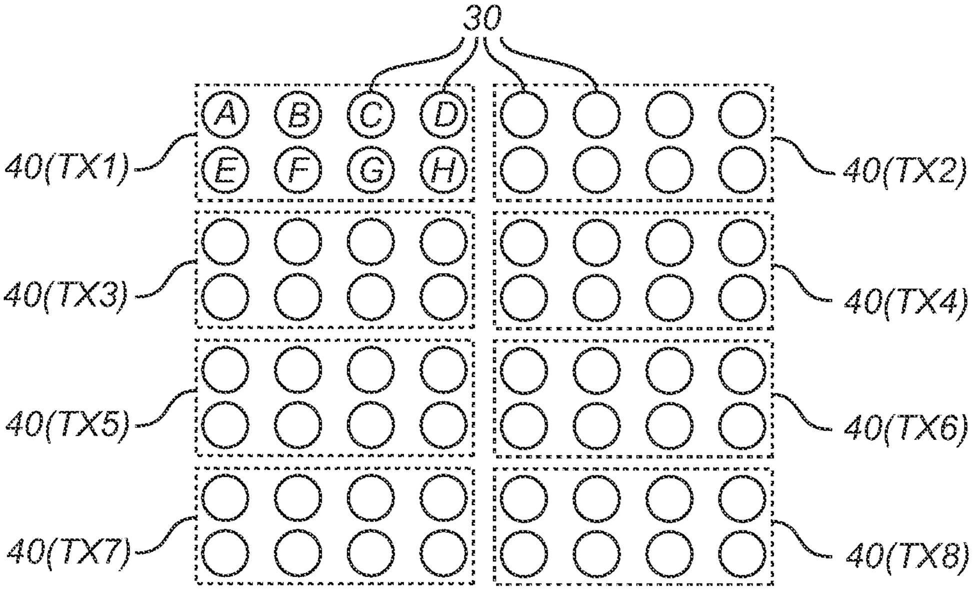

FIG. 4A, finally, shows a case where both the physical transmitters 10 and the physical receivers 20 are arranged in a two-dimensional pattern. More precisely, the physical transmitters 10 and physical receivers 20 are arranged with a nonzero spacing in the first direction (horizontal) as well as the second direction (vertical). The resulting virtual array is shown in FIG. 4B. Here, to avoid unnecessary repetition, only the virtual array elements 30 in the first subarray 40(TX1) have been labeled in accordance with the physical receivers 20, by letters A, B, C, . . . , H. It is understood that this structure, and thus the homology relations, repeats identically in the seven further subarrays 40. The spacings $L_1$, $L_2$, $L_3$, $L_4$ in FIG. 4A can be assigned any values. To make the virtual antenna elements 30 equidistant in the first direction, one may set $L_2/L_1=4$. Similarly, equidistant spacing in the second direction will be obtained if $L_4/L_3=2$.

Figure 7:
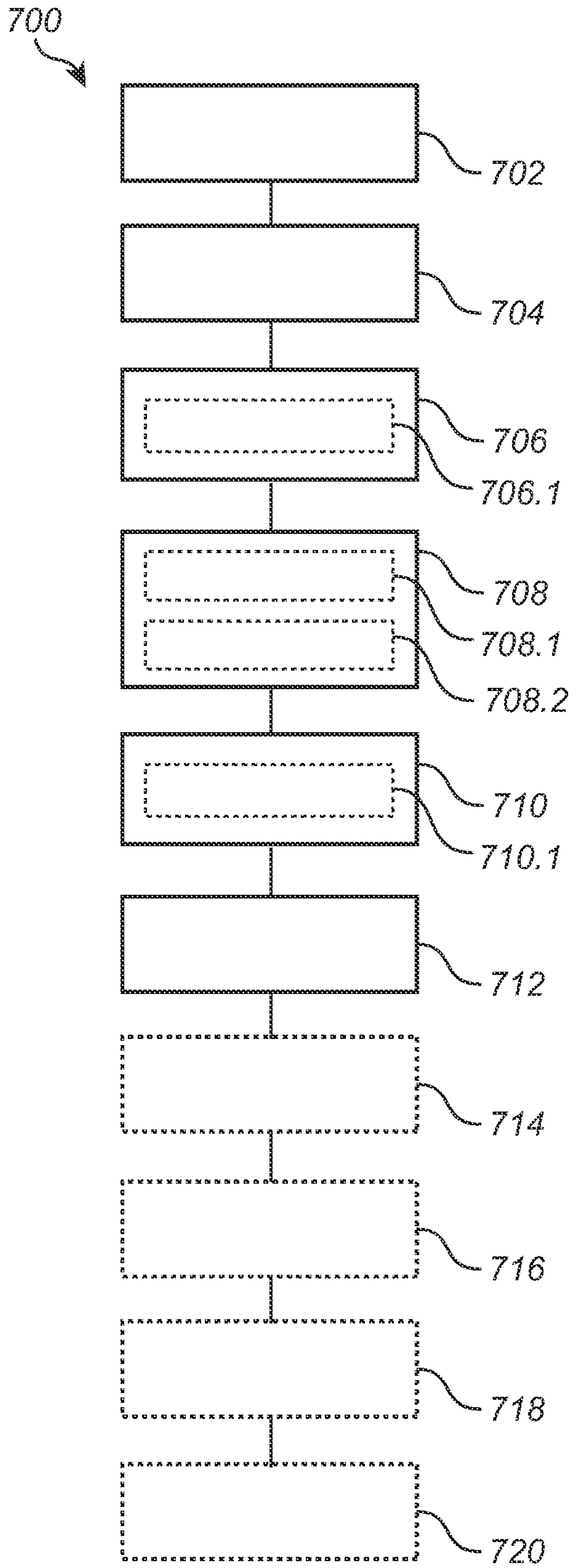
FIG. 7 is a flowchart of a method for resolving a phase ambiguity in a TDM MIMO FMCW radar, according to embodiments herein.

A method 700 for resolving a phase ambiguity between subarrays 40 in a virtual array of a TDM MIMO FMCW radar will now be described with reference to the flowchart in FIG. 7. The method 700 processes a virtual array signal of a range-Doppler bin into a compensated virtual array signal in which a residual phase shift has been reduced or eliminated, while relying on geometric characteristics of the virtual array, including the respective spacings $L_1$, $L_2$, in a first direction, of the physical transmitters 10 and physical receivers 20. As such, it is possible to execute the method 700 on a general-purpose processor with generic data input and data output capabilities.

Alternatively, a signal processing device with processing circuitry configured to perform the method 700, through programming or hardcoding, may be used. The processing circuitry may for example be an application-specific integrated circuit (ASIC), a field-programmable gate array (FPGA) or a system-on-chip. It is recalled that a radar signal processing chain may include the following sequence of functional stages, starting from the antenna side: mixing, analog-to-digital conversion, radio-frequency frontend processing (on the basis of the IF signal) and digital beamforming. Different processing chains may integrate these stages to different degrees. As such, the signal processing device performing the method 700 may be adapted for deployment as a general-purpose radar baseband processor, as a combined frontend and beamforming device, or as a dedicated digital beamforming device.

In a first step 702 of the method 700, a virtual array signal of a range-Doppler bin relating to a scene with a moving object is obtained. For example the range-Doppler bin may be a bin which corresponds to the radar reflection of the moving object, i.e., a range interval that contains the object's range and a velocity interval that contains the object's velocity. The virtual array signal of a range-Doppler bin may be obtained from plurality of IF signals corresponding to a plurality of chirps and to each virtual array element of the virtual array. In the present disclosure, the term virtual array signals used to refer to a signal which has one value for each virtual array element of a virtual array. In the example of the virtual array depicted in FIG. 1A, the IF signal for the leftmost virtual array element (i.e., data collected by the first physical receiver 20 (label A) when excited by the first physical transmitter 10(TX1)) and six chirps c0, c1, . . . , c5 may have the following schematic structure:

$$x_{TX1,A} = \begin{bmatrix} x_{TX1,A}^{c0,t0} & x_{TX1,A}^{c0,t1} & x_{TX1,A}^{c0,t2} & x_{TX1,A}^{c0,t3} & x_{TX1,A}^{c0,t4} & x_{TX1,A}^{c0,t5} & x_{TX1,A}^{c0,t6} & x_{TX1,A}^{c0,t7} \\ x_{TX1,A}^{c1,t0} & x_{TX1,A}^{c1,t1} & \cdots & & & & & \vdots \\ x_{TX1,A}^{c2,t0} & \vdots & & & & & & \\ x_{TX1,A}^{c3,t0} & & & & & & & \\ x_{TX1,A}^{c4,t0} & & & & & & & \\ x_{TX1,A}^{c5,t0} & \cdots & & & & & & x_{TX1,A}^{c5,t7} \end{bmatrix}, \quad (10)$$

where t0, t1, . . . , t7 is a discretization of the interval $[0, T_c]$. (In realistic implementations, the discretization may be finer and the computations may be based on data from a larger number of chirps.) Each row of $x_{TX1A}$ corresponds to one of the chirps, and each entry can be understood as a time sample for that chirp. Range information can be obtained by applying a discrete harmonic transform, for example DFT or FFT, to each row of the IF signal. If FFT is used, this produces the following range spectrum (a "range FFT"):

$$y_{TX1,A} = \begin{bmatrix} y_{TX1,A}^{c0,r0} & y_{TX1,A}^{c0,r1} & y_{TX1,A}^{c0,r2} & y_{TX1,A}^{c0,r3} & y_{TX1,A}^{c0,r4} & y_{TX1,A}^{c0,r5} & y_{TX1,A}^{c0,r6} & y_{TX1,A}^{c0,r7} \\ y_{TX1,A}^{c1,r0} & y_{TX1,A}^{c1,r1} & \cdots & & & & & \vdots \\ y_{TX1,A}^{c2,r0} & \vdots & & & & & & \\ y_{TX1,A}^{c3,r0} & & & & & & & \\ y_{TX1,A}^{c4,r0} & & & & & & & \\ y_{TX1,A}^{c5,r0} & \cdots & & & & & & y_{TX1,A}^{c5,r7} \end{bmatrix} \quad (11)$$

The row dimension of this matrix now corresponds to range, wherein r0, r1, . . . , r7 may be interpreted as range bins, intervals on the radial distance of the reflecting object. The column dimension still corresponds to the six chirps, and all information in the matrix has been derived from measurement data read from the leftmost virtual array element in FIG. 1B. By applying a further FFT to each column of $\gamma_{TX1,A}$, a range-Doppler spectrum (or "Doppler FFT") is obtained:

$$z_{TX1,A} = \begin{bmatrix} z_{TX1,A}^{v0,r0} & z_{TX1,A}^{v0,r1} & z_{TX1,A}^{v0,r2} & z_{TX1,A}^{v0,r3} & z_{TX1,A}^{v0,r4} & z_{TX1,A}^{v0,r5} & z_{TX1,A}^{v0,r6} & z_{TX1,A}^{v0,r7} \\ z_{TX1,A}^{v1,r0} & z_{TX1,A}^{v1,r1} & \cdots & & & & & \vdots \\ z_{TX1,A}^{v2,r0} & \vdots & & & & & & \\ z_{TX1,A}^{v3,r0} & & & & & & & \\ z_{TX1,A}^{v4,r0} & & & & & & & \\ z_{TX1,A}^{v5,r0} & \cdots & & & & & & z_{TX1,A}^{v5,r7} \end{bmatrix} \quad (12)$$

Each entry in the matrix $Z_{TX1,A}$, generally a complex number, may be understood as an element in a discrete representation of the range-Doppler spectrum. A superscript such as $v_i$, $r_j$ shall be understood as referring to the $i^{th}$ velocity (or Doppler) bin and the $j^{th}$ range bin or, for short, the $(i,j)^{th}$ range-Doppler bin. It is noted that the velocity is a signed quantity, in the sense that the range-Doppler spectrum allows movement radially towards the radar to be distinguished from movement radially away from it.

The virtual array signal of one range-Doppler bin to be obtained in step 702 of the method 700 can be represented as the following vector:

$$Z^{(i,j)} = [z^{vi,rj}_{TX1,A}\ z^{vi,rj}_{TX1,B}\ z^{vi,rj}_{TX1,C}\ z^{vi,rj}_{TX1,D}\ z^{vi,rj}_{TX2,A}\ z^{vi,rj}_{TX2,B}\ z^{vi,rj}_{TX2,C}\ z^{vi,rj}_{TX2,D}], \quad (13)$$

where each element is a range-Doppler bin, i.e., a matrix entry from equation (12), for a virtual antenna element 30 of the virtual array. The phase shift between the elements is given as a sum of the velocity-induced phase shift, an AoA-induced phase shift and the phase offsets at boundaries between subarrays. The AoA-induced phase shift can be observed when the AoA is nonzero in the plane of the virtual antenna array, as a result of path differences between the virtual array elements. In preparation of an AoA estimation, the velocity-induced phase shift and the phase offsets first should be eliminated. It is noted that step 702 is completed as soon as the virtual array signal $Z^{(i,j)}$ is available; the foregoing signal processing is not an essential part of the method 700.

Figure 5:
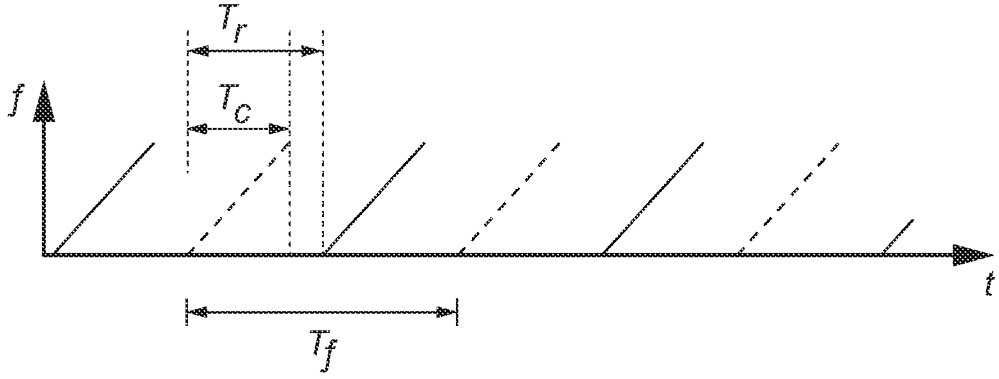
FIG. 5 is a plot of frequency versus time for two physical transmitters in TDM operation.
Figure 6:
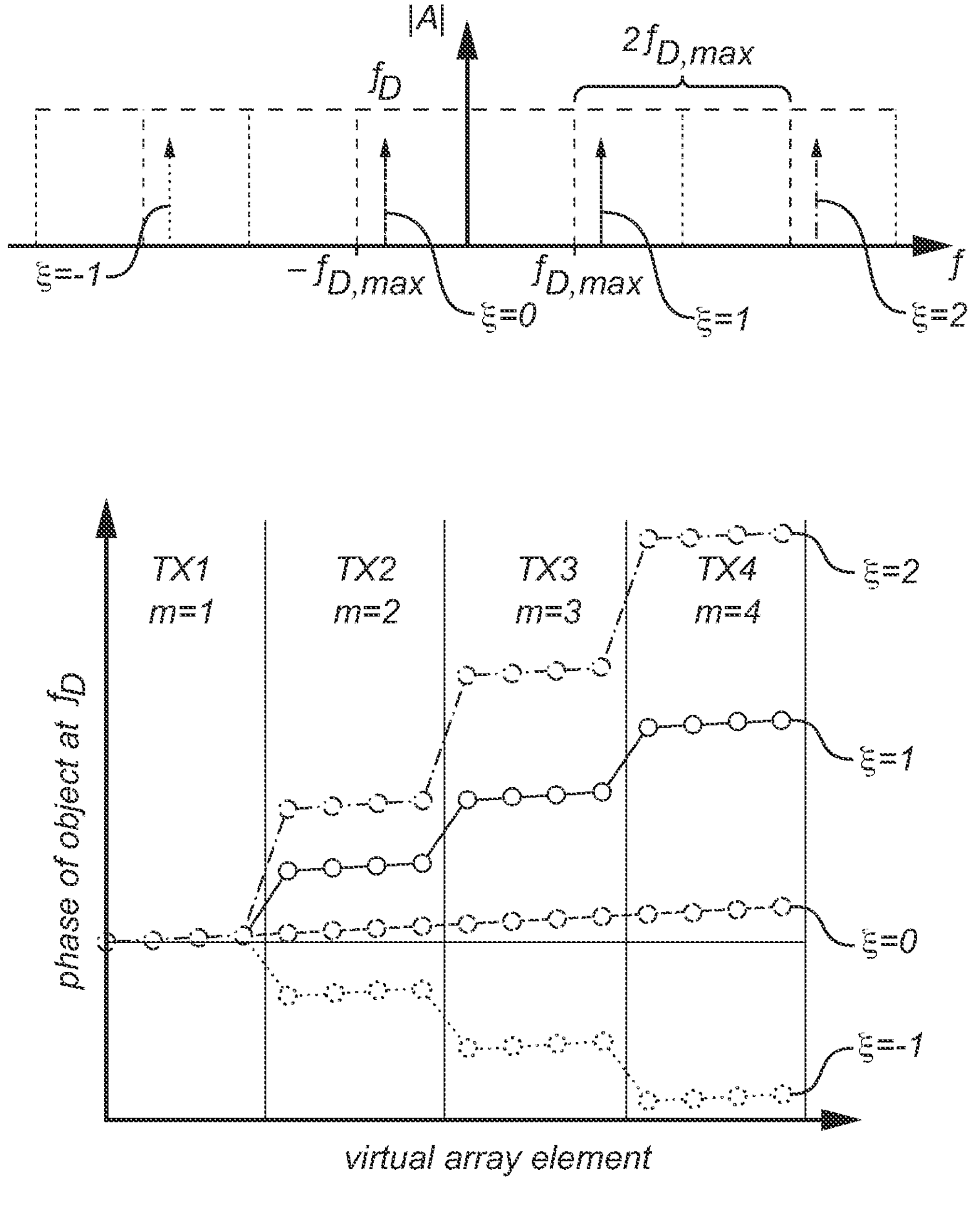
FIG. 6 illustrates frequency folding of the Doppler frequencies of radar-observed moving objects (upper half) and how the observed phase of the moving object varies among virtual array elements of the radar.

In a next step 704, a phase compensation method is executed on the virtual array signal, whereby a compensated virtual array signal $$\tilde{Z}^{(i,j)} = [\tilde{z}^{vi,rj}_{TX1,A}\ \tilde{z}^{vi,rj}_{TX1,B}\ \tilde{z}^{vi,rj}_{TX1,C}\ \tilde{z}^{vi,rj}_{TX1,D}\ \tilde{z}^{vi,rj}_{TX2,A}\ \tilde{z}^{vi,rj}_{TX2,B}\ \tilde{z}^{vi,rj}_{TX2,C}\ \tilde{z}^{vi,rj}_{TX2,D}] \quad (14)$$

is obtained. The phase compensation method used in step 704 may be any per se known phase compensation method from the literature. For example, the phase compensation method described in the above-cited patent publication U.S. Ser. No. 10/627,483B2 may be applied. The Doppler phase $\varphi_d=4\pi T_f v f_c/c$ used in this method can be computed from a representative velocity v (e.g., the center velocity) of a velocity bin corresponding to the moving object under consideration, the chirp repetition time $T_r$ and the carrier frequency $f_c$. The available phase compensation methods will generally require, by way of further input data, the relative timing of the subarray readings, which may be determined from the transmission schedule. The relative timings will typically differ by integer multiples of the repetition time $T_r$ shown in FIG. 5. The phase of the elements of the compensated virtual array signal $\tilde{Z}^{(i,j)}$ is given as a sum of the AoA-induced phase shift and the phase offsets at the subarray boundaries.

It is known that the phase compensation methods, including the phase compensation described in U.S. Ser. No. 10/627,483B2, suppress or remove the velocity-induced phase shift of the virtual array signal while also introducing a phase ambiguity if the moving object's velocity exceeds a threshold $v_{max}$. The threshold may correspond to the maximum speed that is unambiguously detectable using a single subarray; see equation (3) with M=1. For the remainder of the description of the method 700, it will be assumed that the moving object has a radial speed exceeding the threshold $v_{max}$, so that said phase ambiguity—in the form of the phase offsets $\varphi_{0,1}(\zeta)$ at subarray boundaries—are included in the compensated virtual array signal $\tilde{Z}^{(i,j)}$. To execute the present method 700 it is necessary neither to determine the moving object's velocity, nor to compare it with the threshold $v_{max}$; whether or not a residual phase shift is present can be inferred from the output of step 710.

Figure 8:
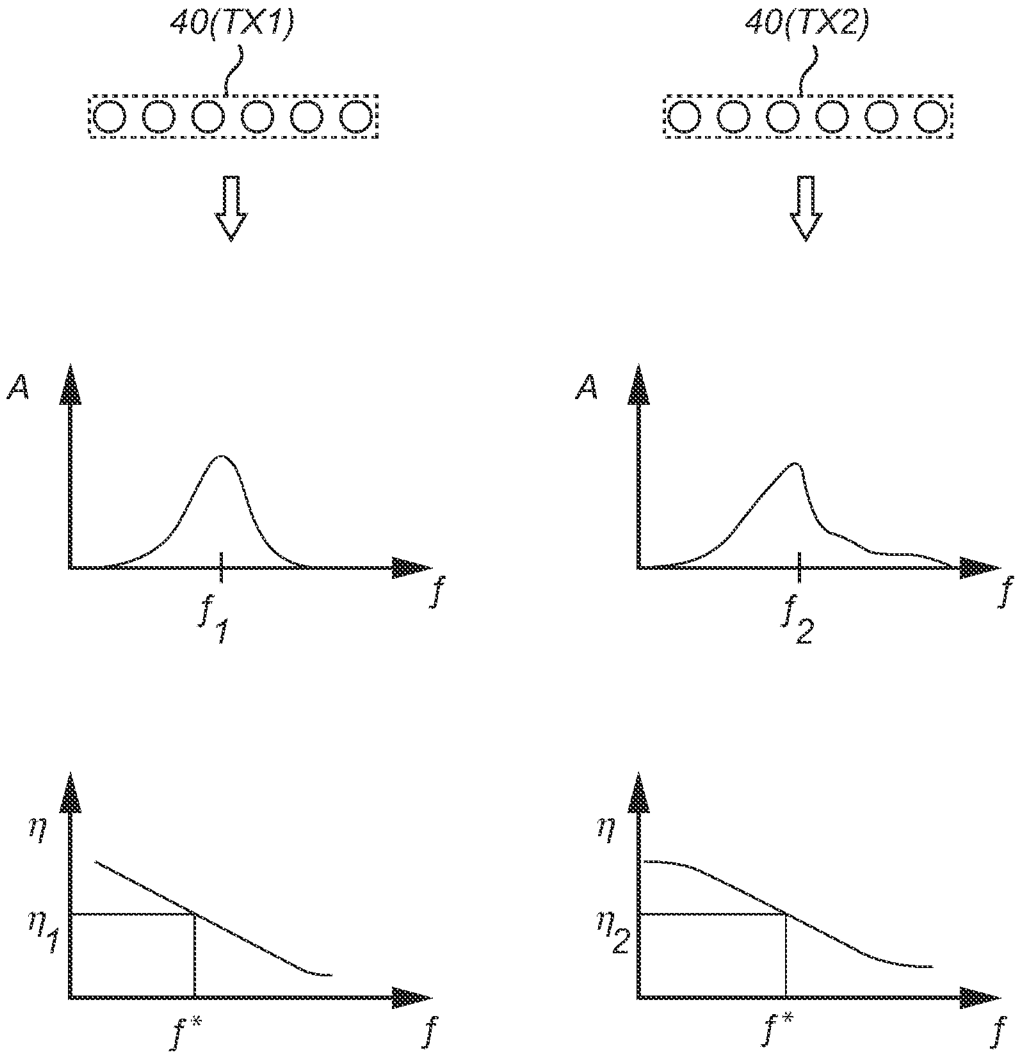
FIG. 8 shows two subarrays of a virtual array (upper part) as well as amplitude and phase plots for frequency spectra of a compensated virtual array signal restricted to each of these subarrays (lower part).

In a third step 706 of the method 700, a frequency spectrum is computed from those elements of the compensated virtual array signal $\tilde{Z}^{(i,j)}$ which correspond to consecutive virtual antenna elements 30 generated by physical receivers 20 belonging to the same row of the array of physical receivers. For the purposes of this disclosure, it is understood a frequency spectrum has an amplitude A part and a phase η part, wherein each of these parts is a function of frequency f; see FIG. 8. In step 706, a frequency spectrum is computed for each of a plurality of the subarrays, i.e., a frequency spectrum is computed for a first subarray, another frequency spectrum is computed for a second subarray and additional frequency spectra are optionally computed for further subarrays. Still with reference to FIG. 8, a schematic frequency spectrum for the subarray 40(TX1) is shown on the left-hand side and a schematic frequency spectrum for the subarray 40(TX2) is shown on the left-hand side. Possibly, a frequency spectrum is computed for each of the subarrays in the virtual array. Such consecutive virtual antenna elements 30 generated by physical receivers 20 in the same row are, for example, the elements labeled A-B-C-D in FIGS. 1B, 2B and 4B. The rows of virtual antenna elements 30 in FIG. 3B, where the subarrays 40 are interleaved, do not pass the condition of being consecutive. The schematic frequency spectra seen in FIG. 8 are illustrative but not necessarily representative of all frequency spectra that are computed on real-world measurement data. For instance, the phase part η(f) of a frequency spectrum based on measurement data could have a faster variation in the interval [−π, π] than in FIG. 8.

The frequency spectrum may be computed by applying a discrete harmonic transform, for example DFT or FFT, to each row of the compensated virtual array signal $\tilde{Z}^{(i,j)}$. For this purpose, an existing specialized hardware device (e.g., dedicated DFT or FFT chip) or an existing software routine may be used which is available on a computer system where the method 700 is executed, such as an FFT software routine that is additionally used for AoA estimation. Because none of the frequency spectra is generated from the full compensated virtual array signal $\tilde{Z}^{(i,j)}$, but rather for one subarray at a time, zero-padding may be necessary to be able to use such an existing software routine.

In a next step 708, an amplitude-peak frequency f* is identified jointly for the frequency spectra of said plurality of the subarrays. The amplitude-peak frequency f* is a frequency for which the amplitude is locally or globally maximal in all of the computed frequency spectra. This identification may be performed in any suitable manner. One option is to compute a sum of the two frequency spectra's respective amplitude parts and to identify 708.1 the global maximum:

$$f^* = \operatorname{argmax}_f(A_{TX1}(f) + A_{TX2}(f)). \quad (15)$$

As seen in FIG. 8, where $A_{TX1}$(f) and $A_{TX2}$(f) refer to the upper left and right plots, the global maximum f* of the sum of the amplitude parts sometimes differs from the global maximum of each amplitude part, i.e., from $f_1=\operatorname{argmax}_f$ $A_{TX1}(f)$ and $f_2=\mathrm{argmax}_f A_{TX2}(f)$. The global maximum f* of the sum of the amplitude parts need not even correspond exactly to an amplitude peak in the respective amplitude part $A_{TX1}(f)$, $A_{TX2}(f)$. The identification in substep 708.1 is a joint identification in the sense of being based on a sum (or mean) of the two amplitude parts.

Another option is to identify 708.2 the amplitude-peak frequency f* as the frequency which corresponds to a main or non-main amplitude peak in each of the respective frequency spectra's amplitude parts. To carry out this identification, a set F of local or global amplitude-peak frequencies is determined for each of the amplitude parts, e.g., $F_{TX1}=\{f_{TX1,1}, f_{TX1,2}, \ldots, f_{TX1,n_{TX1}}\}$ and $\{f_{TX2}=f_{TX2,1}, f_{TX2,2}, \ldots, f_{TX2,n_{TX2}}\}$, where the respective numbers of peaks $n_{TX1}$, $n_{TX2}$ can be different or equal. Next, such amplitude-peak frequencies in $F_{TX1}$ that lack a counterpart in $F_{TX2}$ are eliminated from the set, as are those amplitude-peak frequencies in $F_{TX2}$ that lack a counterpart in $F_{TX1}$. A counterpart in this sense may be a frequency value that differs by at most a predefined threshold Δf. The sets $F_{TX1}$ and $F_{TX2}$ will now contain an equal number of amplitude-peak frequencies which, thanks to the thresholding by Δf, are pairwise approximately equal across the sets. If the sets $F_{TX1}$ and $F_{TX2}$ contain a single element each, the mean of these elements may be assigned to the sought amplitude-peak frequency f*. If the sets $F_{TX1}$ and $F_{TX2}$ still contain multiple elements each, the frequency corresponding to the largest amplitude may be taken to be the sought amplitude-peak frequency f*. The identification in substep 708.2 is a joint identification in the sense that it corresponds to an amplitude-peak frequency in each of the two amplitude parts.

The execution of the method 700 proceeds to a step 710 of determining a residual phase shift between a pair of the subarrays within said plurality of subarrays by comparing, at the amplitude-peak frequency f*, the respective phases of the frequency spectra, denoted $\eta_1=\eta_{TX1}(f^*)$ and $\eta_2=\eta_{TX2}(f^*)$, where $\eta_{TX1}(f)$, $\eta_{TX2}(f)$ refer to the phase parts plotted in the lower portion of FIG. 8, to the left and right. It is noted that the pair of subarrays are not required to be consecutive with respect to the transmission schedule for the purpose of these calculations (this could influence the number of valid folding hypotheses), and no particular modification is needed if they are non-consecutive.

Step 710 may be performed, according to one option, by computing 710.1 a difference between the respective phases of the frequency spectra at the amplitude-peak frequency, which is set equal to the sought residual phase shift $\psi_1$ with respect to the first direction, that is:

$$\psi_1 = \eta_{TX2}(f^*) - \eta_{TX1}(f^*). \tag{16}$$

Equation (16) can be improved with regard to accuracy by forming a mean over multiple pairs of subarrays. For instance, the mean may be taken over a sequence of subarrays that are uniformly spaced in the first direction, as follows:

$$\psi_1 = \frac{1}{M-1}\sum_{m=1}^{M-1}(\eta_{TX(m+1)}(f^*) - \eta_{TXm}(f^*)). \tag{17}$$

In particular, the sequence of subarrays may be adjacent with respect to the first direction.

An optional rounding of the difference (16), (17) computed in substep 710.1 can be performed. Indeed, it is known from theory (see equations (4) and (6)) that if the virtual antenna elements of the virtual array are equidistant in the first direction, then the phase offset is a multiple of 2π/M, where M is the number of physical transmitters 10 with a separation in the first direction. As mentioned, equidistancy of the virtual antenna elements can be ensured if, for example, if $L_2/L_1$ is equal to the number of physical receivers with a separation in the first direction, $M_r$. In the examples discussed above with reference to FIGS. 1A-4B, the number of physical transmitters 10 is M=2. In a 2×3 array of physical transmitters 10, one would have M=3. In the example of the first and fifth virtual array elements in FIG. 1B, after such rounding, the difference is equal to 2π(m−m')ζ*/M, with $$\xi^* = \mathrm{argmin}_{\xi\in\mathbb{Z}}\left|\frac{2\pi(m-m')\xi}{M} - (\eta_{TX2}(f^*) - \eta_{TX1}(f^*))\right|, \tag{18}$$

where furthermore M=2 and m−m'=1. It is believed that those skilled in the art having studied the above derivations and remarks will be able to modify this expression (18) in view of equation (6), so that it holds also when phases from non-adjacent subarrays are compared. Averaging over a sequence of subarrays can be included as well, as desired.

If the array of physical receivers 20 has a plurality of rows in the first direction, the numerical accuracy of the method 700 can optionally be improved by utilizing an enlarged set of input data. In an illustrative example, the plural rows oriented in the first direction are parallel to each other, and they have a mutual spacing in the second direction. This condition is fulfilled in the case illustrated in FIG. 4A, where the physical receivers 20 are arranged in a 2×4 configuration. Accordingly, each of the subarrays 40 in the virtual array in FIG. 4B has two rows in the (horizontal) first direction, one being A-B-C-D and the other being E-F-G-H. The two rows are separated by $L_3$ units in the (vertical) second direction. When data from multiple rows is available, more precisely, the steps of computing 706 a frequency spectrum and identifying 708 an amplitude-peak frequency are repeated for each of these rows. This is to say, each iteration of the steps 706 and 708 considers a particular one of said rows at a time, and it performs the described processing for the pair or pairs of subarrays. The residual phase shift can then be determined 710 as a mean over all rows, e.g., a mean of the difference in the left-hand side of equation (16) for each of the considered rows. It is optional to further improve the accuracy using averaging over additional subarrays, like in equation (17).

After the residual phase shift has been determined, there follows a step 712 of applying its inverse to the compensated virtual array signal 2Q. In the example of FIG. 1B, this means the virtual array signal is replaced by $$\left[\tilde{z}^{vi,rj}_{TX1,A}\ \ \tilde{z}^{vi,rj}_{TX1,B}\ \ \tilde{z}^{vi,rj}_{TX1,C}\ \ \tilde{z}^{vi,rj}_{TX1,D}\ \ \tilde{z}^{vi,rj}_{TX2,A}e^{-i\psi_1}\ \ \tilde{z}^{vi,rj}_{TX2,B}e^{-i\psi_1}\ \ \tilde{z}^{vi,rj}_{TX2,C}e^{-i\psi_1}\ \ \tilde{z}^{vi,rj}_{TX2,D}e^{-i\psi_1}\right], \tag{19}$$

where $\psi_1$ denotes the residual phase shift with respect to the first direction. The inverse $e^{-i\psi_1}$ is applied to the elements of the virtual array signal that correspond to the second subarray 40(TX2), that is, the four elements to the right. The signal (19) is a virtual array signal without the velocity-induced phase shift and without the folding-induced residual phase shift. It is thereby suitable for use in computations, such as AoA estimations, as if it had been collected by a physical array with an equal number (here: 8) of antenna elements.

In further developments of the method 700, it comprises steps for finding and applying an inverse of a second residual phase shift $\psi_2$ with respect to a second direction. This is relevant in a case like the one illustrated in FIGS. 4A and 4B, where the array of physical receivers 20 includes at least one column of physical receivers. It is assumed that the physical receivers 20 have a third spacing $L_3$ in the second direction and the physical transmitters have a fourth spacing $L_4$ in the second direction.

In such further developments, a frequency spectrum of those elements of the compensated virtual array signal $\tilde{Z}^{(i,j)}$ which correspond to consecutive virtual antenna elements 30 generated by physical receivers 20 belonging to the same column is computed (step 714) for each of a second plurality of the subarrays 40. This may be performed along the lines of step 706. For this purpose, indeed, a discrete harmonic transform, such as DFT or FFT, may be used. Each of the frequency spectra has an amplitude part A and a phase part $\eta$, which are functions of frequency f. Next, a second amplitude-peak frequency f is identified (step 716), jointly for the frequency spectra of said second plurality of the subarrays. This may be performed along the lines of step 708. Next, a second residual phase shift between a second pair of the subarrays within said plurality of subarrays is determined determining (step 718) by comparing, at the amplitude-peak frequency f, the respective phases of the frequency spectra. This may be performed along the lines of step 710. It then becomes possible to apply (step 720) an inverse of the second residual phase shift to the compensated virtual array signal $\tilde{Z}^{(i,j)}$. This may be performed along the lines of step 712.

The applying of inverses of both the first and second residual phase shifts is illustrated with reference to the compensated virtual array signal $\tilde{Z}^{(i,j)}$, an 8×8 matrix with a 4×2 block matrix structure, each block having dimension 2×4. The inversion of the first and second residual phase shifts, as in steps 712 and 720, corresponds to an element-wise multiplication by the following matrix:

$$\begin{bmatrix} 1_{2\times4} & e^{-\psi_1}1_{2\times4} \\ e^{-i\psi_2}1_{2\times4} & e^{-\psi_1-\psi_2}1_{2\times4} \\ e^{-2i\psi_2}1_{2\times4} & e^{-\psi_1-2\psi_2}1_{2\times4} \\ e^{-3i\psi_2}1_{2\times4} & e^{-\psi_1-3\psi_2}1_{2\times4} \end{bmatrix}, \tag{20}$$

where $$1_{2\times4} = \begin{bmatrix} 1 & 1 & 1 & 1 \\ 1 & 1 & 1 & 1 \end{bmatrix}. \tag{21}$$

In forming expression (20), an additivity property of the residual phase shift and the equidistancy of the physical transmitters 10 with respect to the second direction have been used. The equidistancy implies that the residual phase shift is constant for all consecutive subarrays in the second direction, i.e., equal to $\psi_2$. The additivity property can be realized in view of equation (6), by which $$\varphi_{m_1,m_2}(\xi)\varphi_{m_2,m_3}(\xi) = \varphi_{m_1,m_3}(\xi). \tag{22}$$

Accordingly, it is not necessary to determine the residual phase shift for all pairs of subarrays, and instead an additive chain can be formed. For example, between the subarrays 40(TX1) and 40(TX6), which corresponds to two downward and one rightward movement, there will be a total residual phase shift of $\psi_1+2\psi_2$.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method for resolving a phase ambiguity between subarrays in a virtual array of a time-division multiplexing (TDM), multiple-input multiple-output (MIMO), frequency modulated continuous-wave (FMCW), radar, wherein the TDM MIMO FMCW radar comprises an array of physical receivers including at least one row of physical receivers with a first spacing in a first direction, and further comprises a plurality of physical transmitters arranged with a second spacing in said first direction, wherein each of the subarrays in the virtual array is generated by a combination of the array of physical receivers and one of the physical transmitters, the method comprising:

obtaining a virtual array signal of a range-Doppler bin relating to a scene with a moving object, each element of the virtual array signal corresponding to one virtual antenna element of the virtual array and including a range-Doppler spectrum value of the range-Doppler bin for said one virtual antenna element;

compensating a velocity-induced phase shift of the virtual array signal using a phase compensation method, which introduces a phase ambiguity between the subarrays if the moving object's velocity exceeds a threshold, thereby obtaining a compensated virtual array signal;

for each of a plurality of the subarrays, computing a frequency spectrum of those elements of the compensated virtual array signal which correspond to consecutive virtual antenna elements generated by physical receivers belonging to the same row;

identifying, jointly for the frequency spectra of said plurality of the subarrays, an amplitude-peak frequency;

determining a residual phase shift between a pair of the subarrays within said plurality of subarrays by comparing, at the amplitude-peak frequency, the respective phases of the frequency spectra; and applying an inverse of the residual phase shift to the compensated virtual array signal.

2. The method of claim 1, wherein identifying the amplitude-peak frequency includes determining a frequency of a main amplitude peak in a sum of the two frequency spectra's respective amplitude parts.

3. The method of claim 1, wherein identifying the amplitude-peak frequency includes determining a frequency which corresponds to a main or non-main amplitude peak in each of the respective frequency spectra's amplitude parts.

4. The method of claim 1, wherein determining the residual phase shift includes computing a difference between the respective phases of the frequency spectra at the amplitude-peak frequency.

5. The method of claim 4, wherein:

the ratio of the first and second spacings is such that the virtual antenna elements of the virtual array are equidistant in the first direction; and determining the residual phase shift further includes rounding the difference between the respective phases of the frequency spectra to a multiple of $2\pi/M$, where M is the number of physical transmitters.

6. The method of claim 1, wherein:

the respective phases of the frequency spectra are compared, at the amplitude-peak frequency, for a plurality of pairs of subarrays which are uniformly spaced in the first direction; and the residual phase shift is determined as a mean over all said pairs of the subarrays.

7. The method of claim 1, wherein computing the frequency spectrum for a subarray includes performing a Fast Fourier Transform, FFT.

8. The method of claim 1, wherein:

the array of physical receivers has a plurality of rows in the first direction;

the steps of computing a frequency spectrum and identifying an amplitude-peak frequency are performed for all rows; and the residual phase shift is determined as a mean over all rows.

9. The method of claim 1, wherein the physical transmitters are used sequentially according to a transmission schedule, and said pair of subarrays are consecutive with respect to the transmission schedule.

10. The method of claim 1, wherein the array of physical receivers includes at least one column of physical receivers with a third spacing in a second direction and the physical transmitters are arranged with a fourth spacing in said second direction, the method further comprising:

for each of a second plurality of the subarrays, computing a frequency spectrum of those elements of the compensated virtual array signal which correspond to consecutive virtual antenna elements generated by physical receivers belonging to the same column;

identifying, jointly for the frequency spectra of said second plurality of the subarrays, a second amplitude-peak frequency;

determining a second residual phase shift between a second pair of the subarrays within said second plurality of subarrays by comparing, at the second amplitude-peak frequency, the respective phases of the frequency spectra; and applying an inverse of the second residual phase shift to the compensated virtual array signal.

11. The method of claim 1, further comprising determining a residual phase shift for all remaining subarrays of the virtual array and applying the inverses thereof.

12. The method of claim 1, wherein the frequency spectrum is computed by applying a discrete Fourier transform to each row of the compensated virtual array signal.

13. The method of claim 1, wherein the amplitude-peak frequency is identified as a global maximum of a sum of the frequency spectra's respective amplitude parts.

14. The method of claim 1, wherein applying the inverse of the residual phase shift comprises multiplying elements of the compensated virtual array signal corresponding to a second subarray by an inverse phase rotation factor.

15. The method of claim 1, wherein the residual phase shift is a folding-induced phase offset resulting from frequency folding when the moving object's radial speed exceeds a maximum unambiguously detectable speed.

16. A method for computing an angle of arrival of a moving object on the basis of a virtual array signal of a range-Doppler bin captured by a virtual array of a time-division multiplexing (TDM), multiple-input multiple-output (MIMO), frequency-modulated continuous-wave (FMCW), radar:

wherein the TDM MIMO FMCW radar comprises an array of physical receivers including at least one row of physical receivers with a first spacing in a first direction, and further comprises a plurality of physical transmitters arranged with a second spacing in said first direction, wherein each of the subarrays in the virtual array is generated by a combination of the array of physical receivers and one of the physical transmitters, the method comprising:

obtaining a virtual array signal of a range-Doppler bin relating to a scene with a moving object, each element of the virtual array signal corresponding to one virtual antenna element of the virtual array and including a range-Doppler spectrum value of the range-Doppler bin for said one virtual antenna element;

compensating a velocity-induced phase shift of the virtual array signal using a phase compensation method, which introduces a phase ambiguity between the subarrays if the moving object's velocity exceeds a threshold, thereby obtaining a compensated virtual array signal;

for each of a plurality of the subarrays, computing a frequency spectrum of those elements of the compensated virtual array signal which correspond to consecutive virtual antenna elements generated by physical receivers belonging to the same row;

identifying, jointly for the frequency spectra of said plurality of the subarrays, an amplitude-peak frequency;

determining a residual phase shift between a pair of the subarrays within said plurality of subarrays by comparing, at the amplitude-peak frequency, the respective phases of the frequency spectra; and applying an inverse of the residual phase shift to the compensated virtual array signal; and computing the angle of arrival on the basis of the processed virtual array signal.

17. A signal processing device for a time-division multiplexing, TDM, multiple-input multiple-output, MIMO, frequency-modulated continuous-wave, FMCW, radar with a virtual array, wherein the TDM MIMO FMCW radar comprises an array of physical receivers including at least one row of physical receivers with a first spacing in a first direction, and further comprises a plurality of physical transmitters arranged with a second spacing in said first direction, wherein each of the subarrays in the virtual array is generated by a combination of the array of physical receivers and one of the physical transmitters, the signal processing device comprising processing circuitry configured to resolve, in a virtual array signal comprising at least one range-Doppler bin, a phase ambiguity between the subarrays of the virtual array by performing a method comprising:

obtaining a virtual array signal of a range-Doppler bin relating to a scene with a moving object, each element of the virtual array signal corresponding to one virtual antenna element of the virtual array and including a range-Doppler spectrum value of the range-Doppler bin for said one virtual antenna element;

compensating a velocity-induced phase shift of the virtual array signal using a phase compensation method, which introduces a phase ambiguity between the subarrays if the moving object's velocity exceeds a threshold, thereby obtaining a compensated virtual array signal;

for each of a plurality of the subarrays, computing a frequency spectrum of those elements of the compensated virtual array signal which correspond to consecutive virtual antenna elements generated by physical receivers belonging to the same row;

identifying, jointly for the frequency spectra of said plurality of the subarrays, an amplitude-peak frequency;

determining a residual phase shift between a pair of the subarrays within said plurality of subarrays by comparing, at the amplitude-peak frequency, the respective phases of the frequency spectra; and applying an inverse of the residual phase shift to the compensated virtual array signal.

18. A non-transitory computer-readable storage medium having stored thereon instructions for implementing a method, when executed on a device having processing capabilities, the method for resolving a phase ambiguity between subarrays in a virtual array of a time-division multiplexing (TDM), multiple-input multiple-output (MIMO), frequency-modulated continuous-wave (FMCW), radar, wherein the TDM MIMO FMCW radar comprises an array of physical receivers including at least one row of physical receivers with a first spacing in a first direction, and further comprises a plurality of physical transmitters arranged with a second spacing in said first direction, wherein each of the subarrays in the virtual array is generated by a combination of the array of physical receivers and one of the physical transmitters, the method comprising:

obtaining a virtual array signal of a range-Doppler bin relating to a scene with a moving object, each element of the virtual array signal corresponding to one virtual antenna element of the virtual array and including a range-Doppler spectrum value of the range-Doppler bin for said one virtual antenna element;

compensating a velocity-induced phase shift of the virtual array signal using a phase compensation method, which introduces a phase ambiguity between the subarrays if the moving object's velocity exceeds a threshold, thereby obtaining a compensated virtual array signal;

for each of a plurality of the subarrays, computing a frequency spectrum of those elements of the compensated virtual array signal which correspond to consecutive virtual antenna elements generated by physical receivers belonging to the same row;

identifying, jointly for the frequency spectra of said plurality of the subarrays, an amplitude-peak frequency;

determining a residual phase shift between a pair of the subarrays within said plurality of subarrays by comparing, at the amplitude-peak frequency, the respective phases of the frequency spectra; and applying an inverse of the residual phase shift to the compensated virtual array signal.

* * * * *